(12) United States Patent
Howard (10) Patent No.: US 8,477,059 B1
(45) Date of Patent: Jul. 2, 2013

(54) REMOTE CONTROL WITH SPEED CHANNEL CHANGING MODE

(75) Inventor: Michael L. Howard, Renton, WA (US)

(73) Assignee: Control4 Corporation, Salt Lake City, UT (US)

(*) Notice: Subject to any disclaimer, the term of this patent is extended or adjusted under 35 U.S.C. 154(b) by 1154 days.

(21) Appl. No.: 11/842,801

(22) Filed: Aug. 21, 2007

(51) Int. Cl.
- *H03K 17/94* (2006.01)
- *H03M 11/00* (2006.01)
- *G08C 19/12* (2006.01)
- *H04L 17/02* (2006.01)
- *H04N 5/44* (2011.01)

(52) U.S. Cl.
USPC ............ 341/176; 341/20; 341/173; 348/734

(58) Field of Classification Search
USPC .......... 348/725, 734; 398/106, 111, 112; 341/20–35, 173–192; 340/825.69, 825.76; 345/169, 159, 167
See application file for complete search history.

(56) References Cited

U.S. PATENT DOCUMENTS

| | | | |
|---|---|---|---|
| 5,477,262 A * | 12/1995 | Banker et al. | 725/38 |
| RE35,343 E * | 10/1996 | Shimada et al. | 386/234 |
| 5,790,189 A * | 8/1998 | Moon | 348/189 |
| RE39,059 E * | 4/2006 | Foster | 715/744 |
| 7,164,450 B2 | 1/2007 | Lamb | |
| 7,174,518 B2 | 2/2007 | Kim | |
| 7,224,410 B1 | 5/2007 | Gerstman | |
| 7,295,253 B1 | 11/2007 | Gerstman | |
| 7,522,222 B2 * | 4/2009 | Sato et al. | 348/734 |
| 2003/0227406 A1 * | 12/2003 | Armstrong | 341/176 |
| 2008/0024682 A1 * | 1/2008 | Chen | 348/734 |
| 2009/0115723 A1 * | 5/2009 | Henty | 345/158 |

\* cited by examiner

*Primary Examiner* — Hai Phan
*Assistant Examiner* — Franklin Balseca
(74) *Attorney, Agent, or Firm* — Austin Rapp & Hardman (57) ABSTRACT

A remote control device is described. The remote control device includes a processor, a transmitter, and memory in electronic communication with the processor. The remote control is capable of operating in a first speed mode. When in the first speed mode, the remote control transmits commands at a first rate. The remote control changes between the first speed mode and a second speed mode when a change mode command is received. The remote control is capable of operating in second speed mode. When in the second speed mode, the remote control transmits commands at a second rate, which is higher than the first rate.

18 Claims, 9 Drawing Sheets

REMOTE CONTROL WITH SPEED CHANNEL CHANGING MODE

TECHNICAL FIELD

The present invention relates generally to the control of electronic devices. More specifically, the present invention relates to systems and methods for providing increased speed in the remote control of a device.

BACKGROUND

The number of television channels available to consumers continues to increase. With the advent of satellite television, consumers can now access television stations that are broadcast from around the world. In addition, the number of locally produced television broadcasts continues to grow along with the population.

With so many options available, the average consumer can experience great difficulty in locating the desired television program or station. If the consumer knows the channel number associated with the program they desire to watch, they may be able to quickly navigate to it using the numeric keys on the remote control. Because of the large number of television stations available, it has become more difficult for the television viewer to remember all the television channel numbers that they enjoy watching. In addition, many consumers prefer to switch channels rapidly when looking for their desired television program or station. This is commonly known as channel surfing.

Many consumers enjoy channel surfing as part of regular television viewing. It is often frustrating for channel surfers when the remote control is unable to navigate between television channels at their desired speed. For this reason, a consumer may desire a remote control capable of more rapidly switching between channels.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

A method for the remote control of a device is described. When operating in a first speed mode, the remote control transmits commands at a first rate. The remote control may change from the first speed mode to a second speed mode. When operating in the second speed mode, the remote control transmits commands at a second rate. The second rate is higher than the first rate. In some embodiments, the second rate is twice the first rate. The commands may be change-channel commands.

In one embodiment, operating in the first speed mode includes transmitting a single command when a button is pressed, and not transmitting a command when the button is released. Further, operating in the second speed mode may include transmitting a command when a button is pressed, and transmitting the same command when the button is released.

In certain embodiments, the remote control changes modes when a speed mode button is pressed. In other embodiments, the remote control changes modes when a button is pressed for a predetermined length of time. A timeout may cause the remote control to change modes. Furthermore, the remote control may include buttons that change the mode and perform a function.

A remote control device is described. The remote control device includes a processor, a transmitter, and memory in electronic communication with the processor. The remote control is capable of operating in a first speed mode. When in the first speed mode, the remote control transmits commands at a first rate. The remote control changes between the first speed mode and a second speed mode when a change mode command is received. The remote control is capable of operating in second speed mode. When in the second speed mode, the remote control transmits commands at a second rate, which is higher than the first rate.

A computer-readable medium comprising instructions that are executable by a remote control device for a television is also disclosed. When operating in a first speed mode, the remote control transmits change-channel commands at a first rate. The remote control may change from the first speed mode to a second speed mode. When operating in the second speed mode, the remote control transmits change-channel commands at a second rate. The second rate is higher than the first rate.

Various embodiments of the invention are now described with reference to the Figures, where like reference numbers indicate identical or functionally similar elements. The embodiments of the present invention, as generally described and illustrated in the Figures herein, could be arranged and designed in a wide variety of different configurations. Thus, the following more detailed description of several exemplary embodiments of the present invention, as represented in the Figures, is not intended to limit the scope of the invention, as claimed, but is merely representative of the embodiments of the invention.

The word "exemplary" is used exclusively herein to mean "serving as an example, instance, or illustration." Any embodiment described herein as "exemplary" is not necessarily to be construed as preferred or advantageous over other embodiments.

Many features of the embodiments disclosed herein may be implemented as computer software, electronic hardware, or combinations of both. To clearly illustrate this interchangeability of hardware and software, various components will be described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Where the described functionality is implemented as computer software, such software may include any type of computer instruction or computer executable code located within a memory device and/or transmitted as electronic signals over a system bus or network. Software that implements the functionality associated with components described herein may comprise a single instruction, or many instructions, and may be distributed over several different code segments, among different programs, and across several memory devices.

As used herein, the terms "an embodiment," "embodiment," "embodiments," "the embodiment," "the embodiments," "one or more embodiments," "some embodiments," "certain embodiments," "one embodiment," "another embodiment" and the like mean "one or more (but not necessarily all) embodiments of the disclosed invention(s)," unless expressly specified otherwise.

The term "determining" (and grammatical variants thereof) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The phrase "based on" does not mean "based only on," unless expressly specified otherwise. In other words, the phrase "based on" describes both "based only on" and "based at least on."

Figure 1:
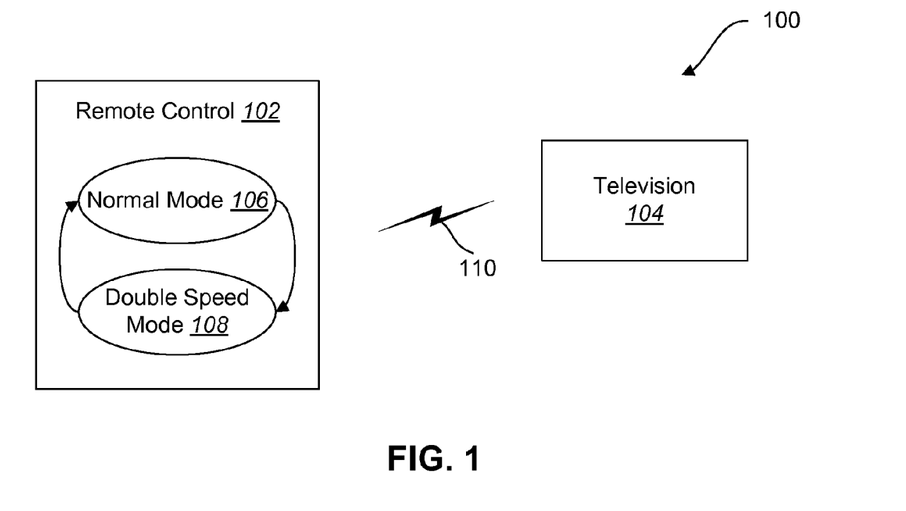
FIG. 1 is a block diagram illustrating an embodiment of a system for providing multiple control modes in a remote control for the control of a device.

FIG. 1 is a block diagram illustrating an embodiment of a system 100 for providing multiple control modes in a remote control 102 for the control of a device 104. The remote control 102 may have a plurality of modes for controlling the device 104. The modes may include a normal mode 106 and a double speed mode 108. The controlled device 104 may be a television 104. The remote control 102 may be in electronic communication 110 with the television 104. For example, the remote control 102 may transmit commands to the television 104 via infrared (IR), radio frequency (RF), a wireless connection using the 802.11g (WiFi) standard, a wireless connection using the 802.15.4 (ZigBee) standard, an Ethernet connection, and/or other wired or wireless connections.

As mentioned, the remote control 102 may have a plurality of modes including a normal mode 106 and a double speed mode 108. When in normal mode 106, the remote control may transmit commands at a first rate. When in double speed mode 108, the remote control may transmit commands at a second rate. In some embodiments, the second rate may be approximately twice the first rate. In these embodiments, when the remote control is operating in double speed mode, a user may be able to change channels at approximately twice the rate as is possible when operating in normal mode.

In some embodiments, the second rate may be more than twice the first rate. In these embodiments, when the remote control is operating in the higher speed mode, a user may be able to change channels at a rate greater than twice the rate as is possible when operating in normal mode.

Figure 2:
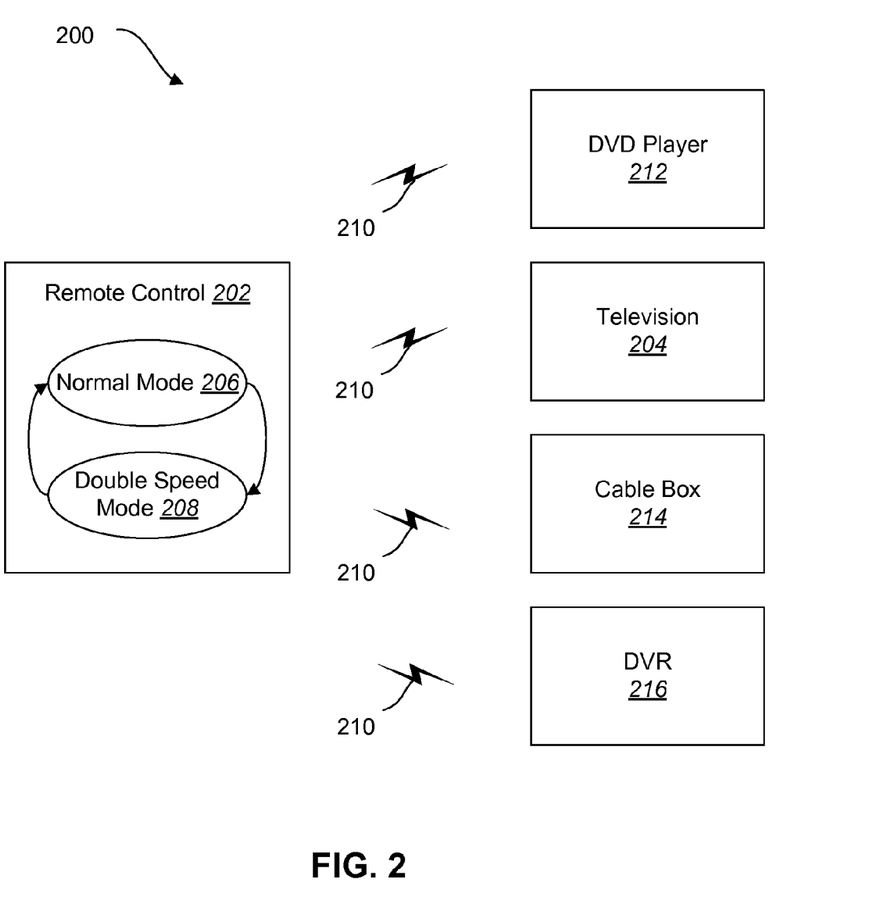
FIG. 2 is a block diagram illustrating an embodiment of a system for providing multiple control modes in a remote control for controlling audio and/or video devices.

FIG. 2 is a block diagram illustrating an embodiment of a system 200 for providing multiple control modes in a remote control 202 for controlling audio and/or video devices. The remote control 202 may be in electronic communication 210 with one or more of a plurality of electronically controlled audio and video devices. The remote control modes may include a normal mode 206 and a double speed mode 208. Audio devices may include, but are not limited to, AM/FM radio receivers, XM radio receivers, CD players, MP3 players, cassette tape players, and other devices capable of producing an audio signal. Video devices may include, but are not limited to, televisions 204, monitors, projectors, cable boxes 214, DVD players 212, DVRs (Digital Video Recorders) 216 and other devices capable of producing a video signal.

Figure 3:
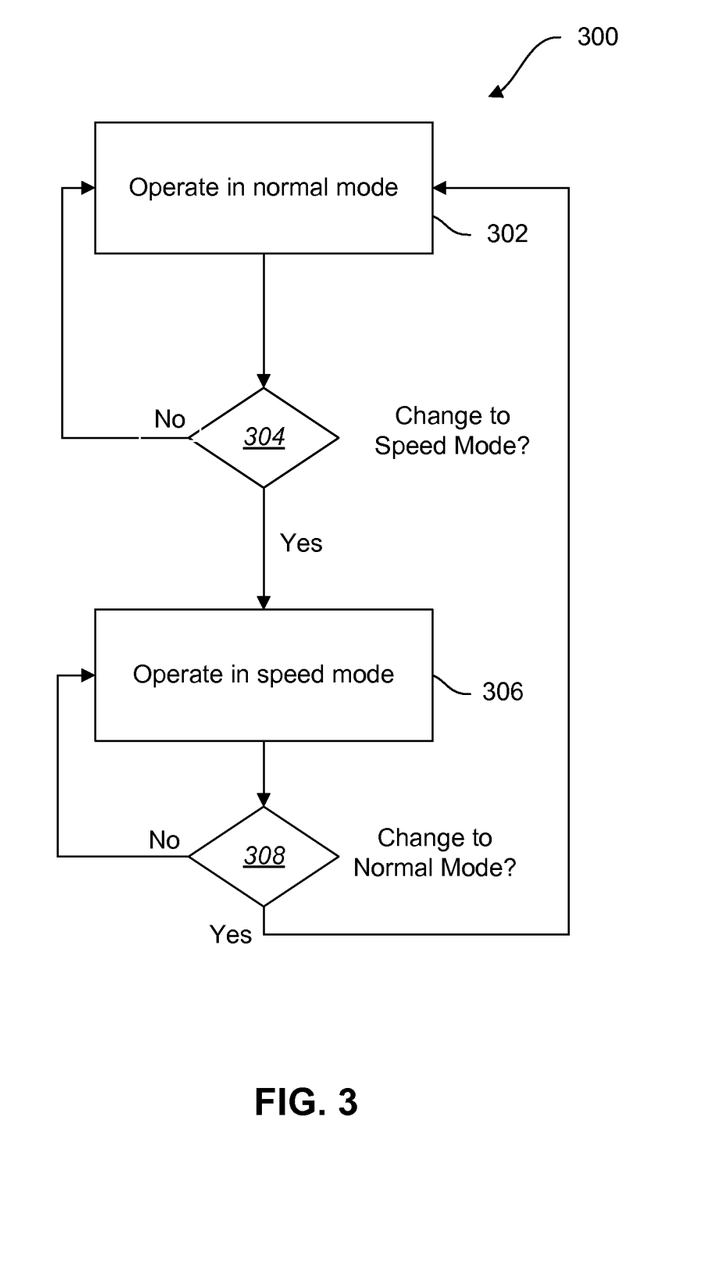
FIG. 3 is a flow diagram of an embodiment of a method for operating a remote control in both normal mode and double speed mode.

FIG. 3 is a flow diagram of an embodiment of a method 300 for operating a remote control 102 in both a normal mode and a speed mode. Speed mode may cause the remote control 102 to operate at a higher rate than when it is in normal mode for commands that will be enhanced in some way by operating at a higher rate. One common function that may benefit from these systems and methods is changing channels. In an embodiment where the channel changing functionality has been enhanced with a speed mode, the speed mode may cause the remote control 102 to change channels at a higher rate than when it is in normal mode. In normal mode the remote control 102 may change channels at a first rate. In speed mode the remote control 102 may change channels at a second rate, where the second rate is higher than the first rate.

The method 300 may include the remote control 102 operating 302 in normal mode. The remote control 102 may determine 304 whether a request to change to speed mode has been made. A request to change to speed mode may be made by pushing a speed mode button on the remote control 102, or it may be made by holding in one of the command buttons for a predetermined amount of time. A request to change to speed mode may also be referred to as a change mode command. If a request to change to speed mode has not been made, the remote control 102 may continue to operate 302 in normal mode. If a request to change to speed mode has been made, the remote control 102 may begin operating 306 in speed mode. When operating 306 in speed mode, the remote control 102 may determine 308 whether a request to change to normal mode has been made. A request to change to normal mode may be made by pressing the speed mode button (illustrated in FIG. 9), or it may be made after a sufficient inactivity delay has occurred. If a request to change to normal mode has not been made, the remote control 102 may continue to operate 306 in speed mode. If a request to change to normal mode has been made, the remote control 102 may return to operate 302 in normal mode.

The double-speed mode (or the speed mode, depending on the particular embodiment) may be entered using a designated button press, such as one that would be labeled "double-speed". Alternatively, one or more buttons may combine the signal to enter the double speed mode with the specific button function. An example of this would be a button labeled "double-speed up". In this embodiment, this "double-speed up" button would cause the system to both enter a double speed mode and advance to the next channel. The mode applies to the behavior of the button, but it would not be correct to simply say that the button always toggles on each press and release because the final selection occurs when no activity is detected for a preset period of time. This is important in the case that the desired channel is selected by pressing the button. If it was not for the double-speed mode, the next release would also change the channel. Another alternative for adding the double speed functionality is to have a "shift" function on the control device. This shift function changes the meaning of a normal button to that of a double-speed button.

Figure 4:
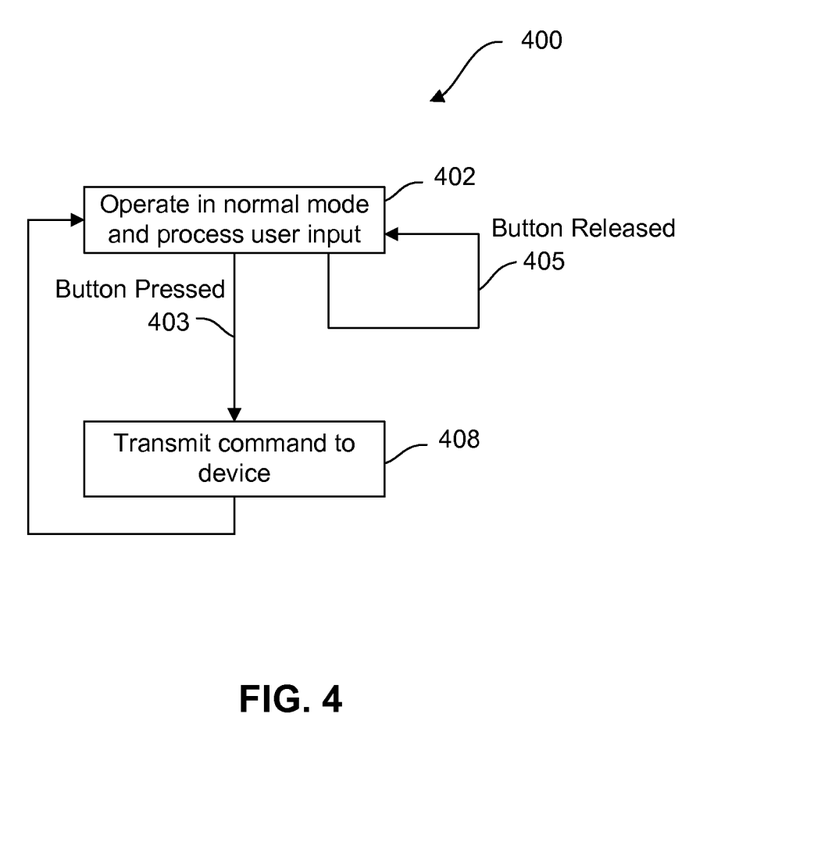
FIG. 4 is a flow diagram of an embodiment of a method for a remote control operating in normal mode.

FIG. 4 is a flow diagram of an embodiment of a method 400 for a remote control 102 operating 402 in normal mode. When operating 402 in normal mode, the remote control 102 may process user input. When a button is pressed 403, the remote control 102 may transmit 408 the command associated with the button to the device and may return to operating 402 in normal mode. When a button is released 405, the remote control 102 may perform no actions and return to operating 402 in normal mode.

Figure 5:
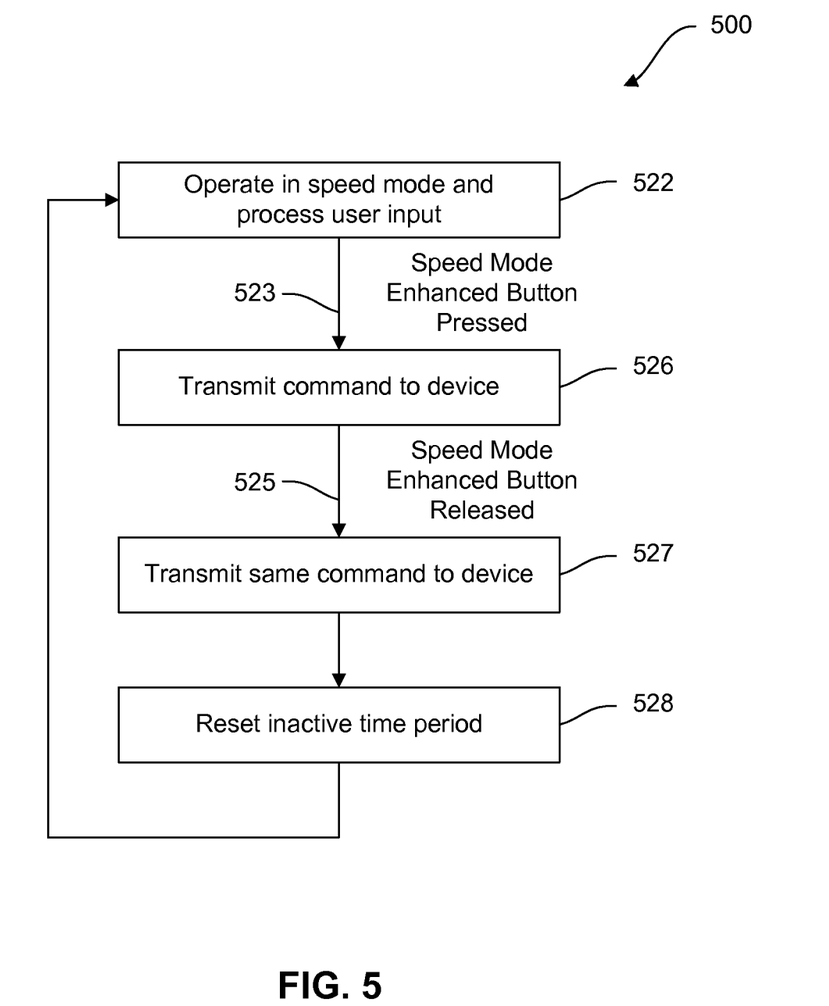
FIG. 5 is a flow diagram of an embodiment of a method for a remote control operating in speed mode.

FIG. 5 is a flow diagram of an embodiment of a method 500 for a remote control 102 operating 522 in speed mode. Speed mode may be used in the remote control 102 for buttons that will be enhanced in some way by operating at a higher rate. One common function that may benefit from these systems and methods is changing channels. Other examples of functions that may be enhanced with a speed mode include, but are not limited to, channel up, channel down, volume up, volume down, or guide navigation buttons. Any button may be enhanced with speed mode. Some buttons or functions (e.g., power on) may not benefit from a speed mode. Herein, a button or function that has been enhanced with speed mode may be referred to as a speed mode enhanced button.

The channel up function may cause the audio/video device to tune or select the next channel in a sequence of channels. This sequence could be a simple numerical progression, or it may be a progression that cycles through the list of available channels, or user-selected favorite channels. When using the double-speed up channel function, each press or release of the button will advance to the next in the sequence.

As indicated, FIG. 5 is a flow diagram of an embodiment of a method 500 for a remote control 102 operating 522 in speed mode and processing user input. When a speed mode enhanced button is pressed 523, the command associated with the speed mode enhanced button is transmitted 526 to the device. When the button is released 525, the same command associated with the button may be transmitted 527 to the device. With this method, two commands were transmitted with one button press.

In this embodiment, a timer may be used to change the mode of the remote control 102 to normal mode if it has not been used for a certain amount of time (i.e., a timeout period). In this embodiment, an inactive time period value may then be reset 528. The remote control 102 may then return to operating 522 in speed mode and processing user input.

Figure 6:
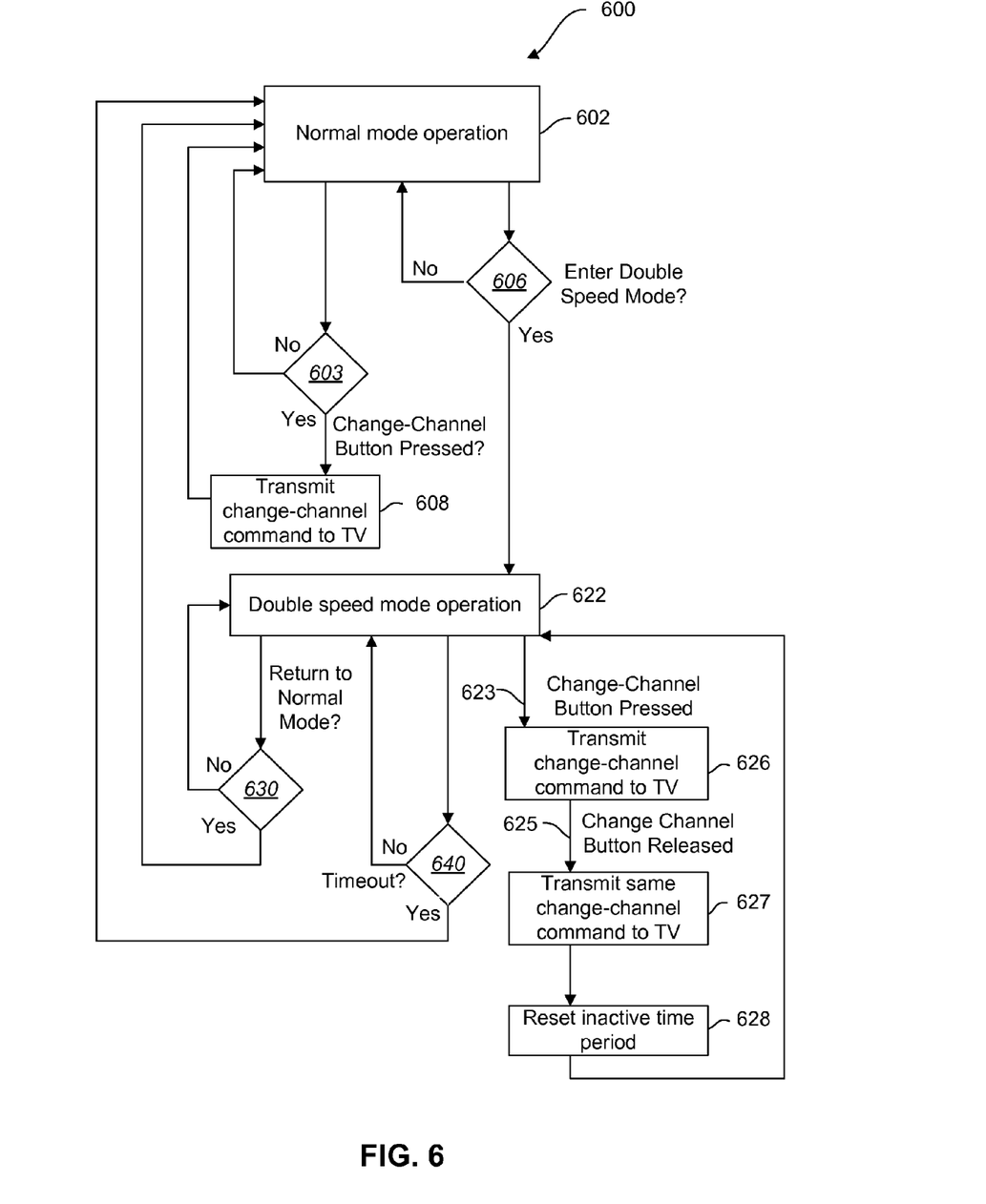
FIG. 6 is a flow diagram of an embodiment of a method for a remote control operating in normal mode and in double speed mode.

FIG. 6 is a flow diagram of an embodiment of a method 600 for a remote control 102 operating 602 in normal mode and operating 622 in double speed mode. For the embodiment illustrated in FIG. 6, the change-channel buttons are the speed mode enhanced buttons. When operating 602 in normal mode, the remote control 102 may process user input. The remote control 102 may determine 606 whether a request to change to double speed mode has been made. A request to change to double speed mode may be made by pressing a speed mode button (illustrated in FIG. 9), or it may be made by holding in one of the command buttons for a predetermined amount of time. If a request to change to double speed mode has been made, the remote control 102 may begin operating 622 in double speed mode. If a request to change to double speed mode has not been made, the remote control 102 may continue operating 602 in normal mode.

When operating 602 in normal mode and a change-channel button is pressed 603, the remote control 102 may transmit 608 a change-channel command to the television 104. When a change-channel button is released, the remote control 102 may perform no actions and return to operating 602 in normal mode.

When operating 622 in double speed mode, the remote control 102 may process user input. The remote control 102 may receive a request to return 630 to normal mode. The request to return 630 to normal mode may be made by pressing the speed mode button. If a request to change to normal mode has been made, the remote control 102 may begin operating 602 in normal mode. In this embodiment, a timer may be used to change the mode of the remote control 102 to normal mode if it has not been used for a certain amount of time (i.e., a timeout period). If it is determined 640 that a timeout has occurred, then the remote control 102 may return to operating 602 in normal mode. If it is determined 640 that a timeout has not occurred, then the remote control 102 may continue operating 622 in double speed mode.

When operating 622 in double speed mode and a change-channel button is pressed 623, the remote control 102 may transmit 626 a change-channel command to the television 104. When the change-channel button is released 625, the remote control 102 may transmit 627 the same change-channel command to the television 104. With this method, two commands were transmitted with one button press. In this embodiment, an inactive time period value may then be reset 628. The inactive time period value may be compared 640 with the timeout period value to determine when a timeout has occurred that should cause the remote control 102 to return to normal mode operation 602. The remote control 102 may then return to operating 622 in double speed mode and processing user input.

Figure 7:
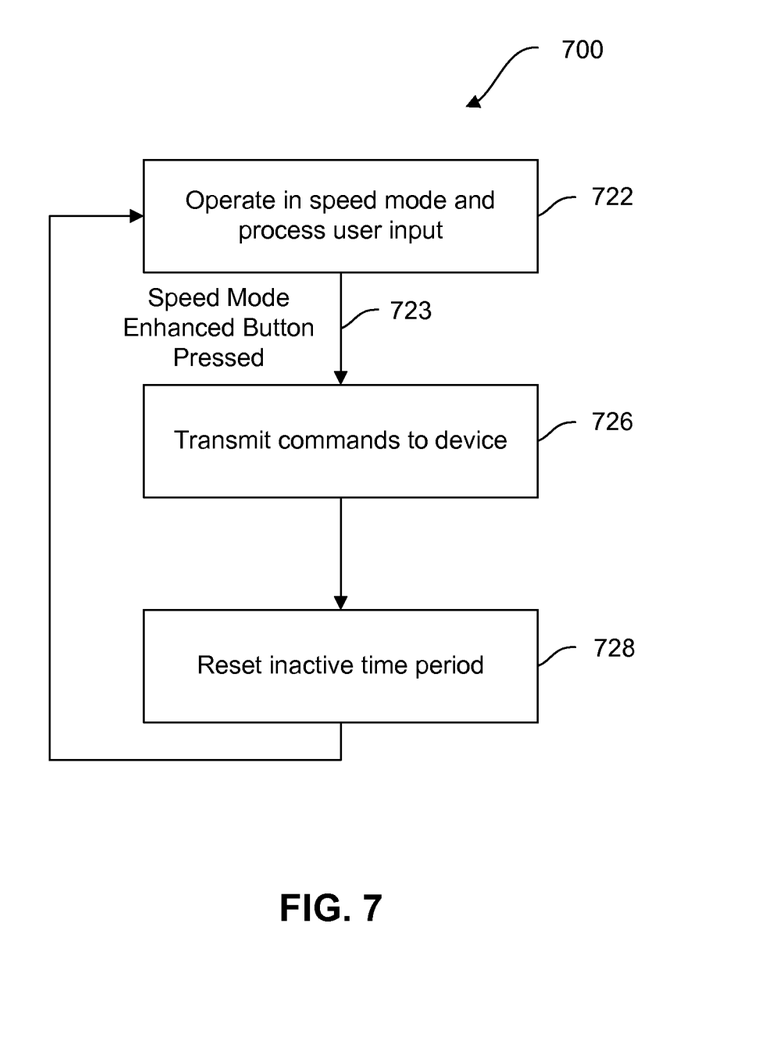
FIG. 7 is a flow diagram of another embodiment of a method for a remote control operating in speed mode.

FIG. 7 is a flow diagram of another embodiment of a method 700 for a remote control 102 operating 722 in speed mode and processing user input. When a speed mode enhanced button is pressed 723 in this embodiment, the command associated with the speed mode enhanced button may be transmitted 726 multiple times to the device. Depending on the rate of the speed mode, the number of transmissions 726 of the command may vary. When the speed mode enhanced button is released in this embodiment, no commands are transmitted to the device. With this method of FIG. 7, multiple commands were transmitted with one button press.

In this embodiment, a timer may be used to change the mode of the remote control 102 to normal mode if it has not been used for a certain amount of time (i.e., a timeout period). In this embodiment, an inactive time period value may then be reset 728. The remote control 102 may then return to operating 722 in speed mode and processing user input.

Figure 8:
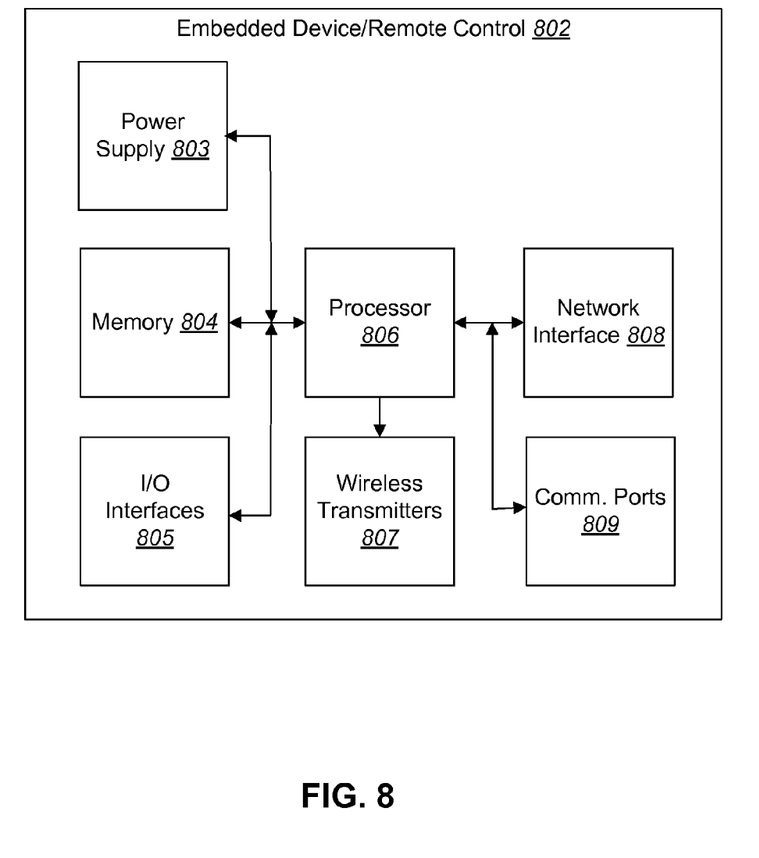
FIG. 8 is a block diagram illustrating various hardware components that may be used in an embodiment of an embedded device/remote control.

FIG. 8 is a block diagram illustrating various hardware components that may be used in an embodiment of an embedded device/remote control 802. The embedded device/remote control 802 may include a processor 806 that is in electronic communication with memory 804. The processor 806 controls the operation of the embedded device/remote control 802 and may be embodied as a microprocessor, a microcontroller, a digital signal processor (DSP), state machine, etc. In addition, the processor may be implemented as a combination of discrete components, a combination of a DSP and a microprocessor, a plurality of microprocessors, one or more microprocessors in conjunction with a DSP core, or any other such configuration.

The processor 806 may perform logical and arithmetic operations based on program instructions, or logical definitions, stored within the memory 804 or circuits contained within the processor 806. The memory 804 may include any electronic component capable of storing electronic information, and may be embodied as read only memory (ROM), random access memory (RAM), magnetic disk storage media, optical storage media, flash memory devices in RAM, on-board memory included with the processor 806, EPROM memory, EEPROM memory, registers, hard disk, a removable disk, a CD-ROM, etc. The memory 804 may store program instructions and other types of data. The program instructions may be executed by the processor 806 to implement some or all of the methods disclosed herein.

The embedded device/remote control 802 may include a power supply 803. The embedded device/remote control 802 may include a network interface 808 that allows the embedded device/remote control 802 to connect using wireless or wired connections. The network interface 808 may use various protocols to enable the embedded device/remote control 802 to interface with any network.

The embedded device/remote control 802 may include wireless transmitters 807 for sending transmissions or commands to a device, such as a television 104. The transmitter 807 may transmit commands to the television 104 via infrared (IR), radio frequency (RF), a wireless connection using the 802.11g (WiFi) standard, a wireless connection using the 802.15.4 (ZigBee) standard, an Ethernet connection, and/or other wired or wireless connections.

The embedded device/remote control 802 may include I/O interfaces 805. For example, the I/O interfaces 805 may include inputs and/or outputs such as buttons, selection dials, serial ports, contact ports, relay ports, IR windows, IR ports, video sense loop ports, audio ports, and video ports. The embedded device/remote control 802 may include communication ports 809. The communication ports 809 may include USB ports, firewire ports, or other ports for communicating with other devices. Some embedded devices/remote controls 802 may not include all of the illustrated components. Other embedded devices/remote controls 802 may include additional components.

Figure 9:
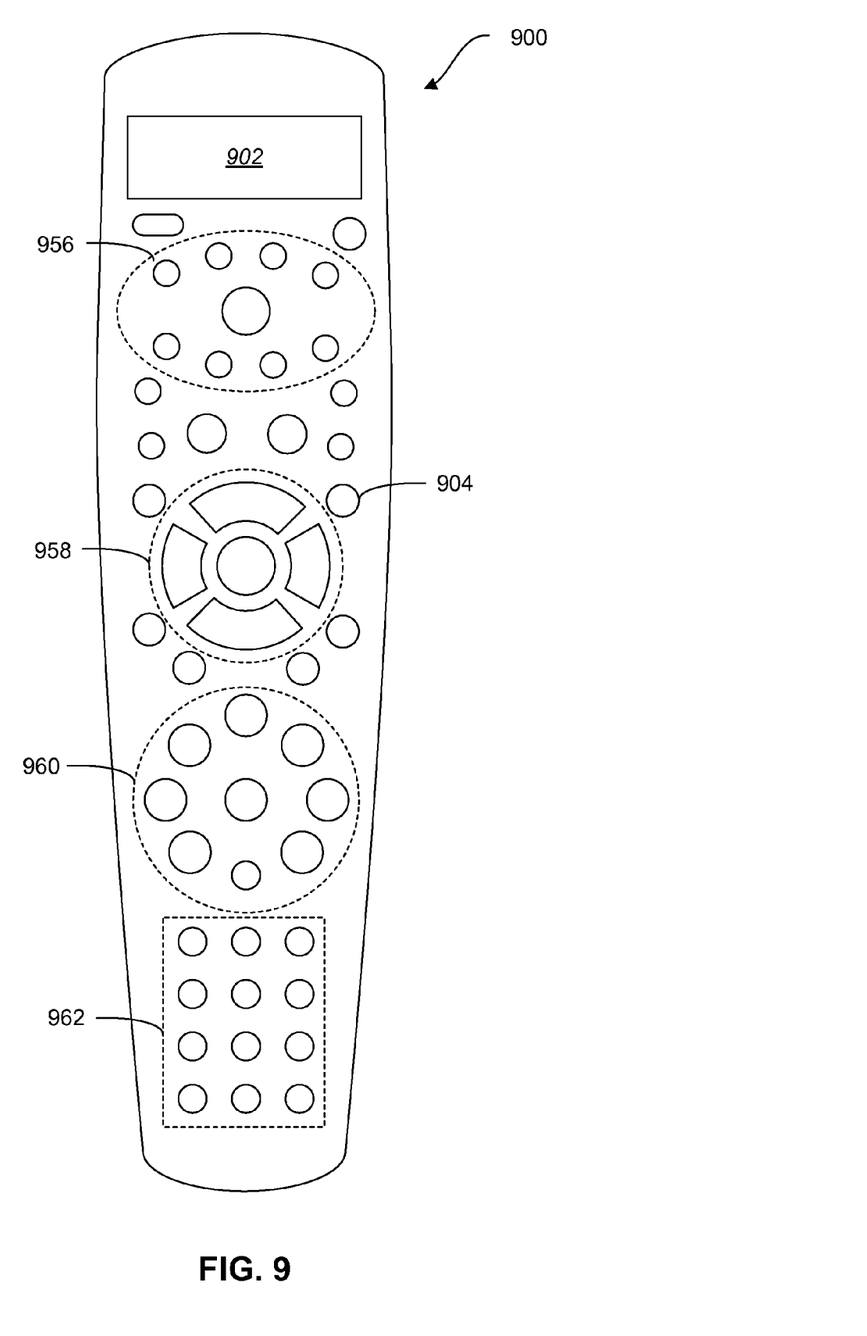
FIG. 9 is a block diagram illustrating the various features available in one possible embodiment of a remote control.

FIG. 9 is a block diagram illustrating the various features available in one possible embodiment of a remote control 900. The remote control 900 may include a display area 902. The display area 902 may be a backlit LCD screen. In some embodiments, the display area 902 may be a simple LCD screen such that the LCD screen has limited capacity to display information. The remote control 900 may include various I/O interfaces 805. The I/O interfaces 805 may include buttons or controls for user input. For example, the remote control 900 may include activity selection buttons 956, navigation controls 958, device control inputs 960, input controls 962, and/or other I/O interfaces 805. The activity selection buttons may allow the user to select which devices to control. For example, the activity selection buttons may include buttons that allow the user to control televisions, video recording/playback devices, audio recording/playback devices, and/or other devices.

The input controls may include numeric, alphanumeric, or other arrangements of input buttons. The input controls may also include a speed button 904. The speed button 904 may be used to cause the remote control 900 to enter speed mode. As discussed earlier, some embodiments may not have a dedicated speed button 904, but may instead include buttons that combine the signal to enter the speed mode with the specific button function. For example, in this embodiment there may be a channel-up button, as well as a double-speed channel-up button. Additionally, by way of example, this embodiment may include a channel-down button, as well as a double-speed channel-down button.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array signal (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Functions such as executing, processing, performing, running, determining, notifying, sending, receiving, storing, requesting, and/or other functions may include performing the function using a web service. Web services may include software systems designed to support interoperable machine-to-machine interaction over a computer network, such as the Internet. Web services may include various protocols and standards that may be used to exchange data between applications or systems. For example, the web services may include messaging specifications, security specifications, reliable messaging specifications, transaction specifications, metadata specifications, XML specifications, management specifications, and/or business process specifications. Commonly used specifications like SOAP, WSDL, XML, and/or other specifications may be used.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The methods disclosed herein comprise one or more steps or actions for achieving the described method. The method steps and/or actions may be interchanged with one another without departing from the scope of the present invention. In other words, unless a specific order of steps or actions is required for proper operation of the embodiment, the order and/or use of specific steps and/or actions may be modified without departing from the scope of the present invention.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A method for the remote control of a device, the method comprising:
   operating in a first speed mode, wherein a remote control transmits commands at a first rate when operating in the first speed mode;
   changing the remote control from the first speed mode to a second speed mode by detecting an activation of a remote control button, wherein the second speed mode applies to multiple remote control buttons; and
   operating in the second speed mode, wherein the remote control transmits commands at a second rate when operating in the second speed mode, and wherein the second rate is higher than the first rate, wherein after changing from the first speed mode to the second speed mode, the remote control continues to operate in the second speed mode until a request to change to the first speed mode or until a timeout occurs.

2. The method of claim 1, wherein the second rate is twice the first rate.

3. The method of claim 1, wherein the commands comprise change-channel commands.

4. The method of claim 1, wherein operating in the first speed mode comprises:
   transmitting a single command when a button is pressed; and
   not transmitting a command when the button is released.

5. The method of claim 1, wherein the remote control changes from the first speed mode to the second speed mode when a speed mode button is pressed.

6. The method of claim 1, wherein the remote control button is a speed mode button.

7. The method of claim 1, wherein operating in the second speed mode comprises:
   transmitting a command when a button is pressed; and
   transmitting the same command when the button is released.

8. The method of claim 1, wherein the remote control changes modes when a button is pressed for a predetermined length of time.

9. A remote control device comprising:
   a processor;
   a transmitter;
   memory in electronic communication with the processor; and
   instructions stored in the memory, the instructions being executable to:
   operate in a first speed mode, wherein the remote control transmits commands at a first rate;
   change the remote control between the first speed mode and a second speed mode when a change mode command is received by detecting an activation of a remote control button, wherein the second speed mode applies to multiple remote control buttons; and
   operate in the second speed mode, wherein the remote control transmits commands at a second rate, and wherein the second rate is higher than the first rate, wherein after changing from the first speed mode to the second speed mode, the remote control continues to operate in the second speed mode until a request to change to the first speed mode or until a timeout occurs.

10. The remote control of claim 9, wherein the second rate is twice the first rate.

11. The remote control of claim 9, further comprising a change-channel button, and wherein the commands comprise change-channel commands.

12. The remote control of claim 9, wherein the remote control button is a speed mode button.

13. The remote control of claim 9, wherein the instructions for operating in the second speed mode are further executable to:
   transmit a command when a button is pressed; and
   transmit the same command when the button is released.

14. The remote control of claim 9, wherein the instructions for operating in the second speed mode are further executable to:
   transmit multiple commands when a button is pressed one time.

15. The remote control of claim 9, wherein the remote control changes modes when a button is pressed for a predetermined length of time.

16. The remote control of claim 9, further comprising:
   a plurality of regular buttons; and
   a plurality of speed mode enhanced buttons.

17. The remote control of claim 16, wherein the plurality of regular buttons always operate in the first speed mode, and wherein the plurality of speed mode enhanced buttons are configured to have the first speed mode and the second speed mode.

18. A non-transitory computer-readable medium comprising instructions that are executable by a remote control device for a television to:
   operate in a first speed mode, wherein a remote control transmits change-channel commands at a first rate;
   change the remote control between the first speed mode and a second speed mode when a change mode command is received by detecting an activation of a remote control button, wherein the second speed mode applies to multiple remote control buttons; and
   operate in the second speed mode, wherein the remote control transmits change-channel commands at a second rate, and wherein the second rate is higher than the first rate, wherein after changing from the first speed mode to the second speed mode, the remote control continues to operate in the second speed mode until a request to change to the first speed mode or until a timeout occurs.

* * * * *